United States Patent
Lochrane et al.

(10) Patent No.: US 10,920,628 B2
(45) Date of Patent: Feb. 16, 2021

(54) COOLING ASSEMBLY FOR A FILTER HEAD OF AN ENGINE

(71) Applicant: CUMMINS INC., Columbus, IN (US)

(72) Inventors: Thomas James Lochrane, Gerry, NY (US); Stephen D. Cofer Jr., Sugar Grove, PA (US); Thomas Lee Mack, Columbus, IN (US)

(73) Assignee: Cummins Inc., Columbus, IN (US)

( * ) Notice: Subject to any disclaimer, the term of this patent is extended or adjusted under 35 U.S.C. 154(b) by 58 days.

(21) Appl. No.: 15/234,333

(22) Filed: Aug. 11, 2016

(65) Prior Publication Data

US 2017/0058729 A1    Mar. 2, 2017

Related U.S. Application Data (60) Provisional application No. 62/209,579, filed on Aug. 25, 2015.

(51) Int. Cl.
*F01M 5/00* (2006.01)
*F01M 11/03* (2006.01)
(Continued)

(52) U.S. Cl.
CPC ............ *F01M 5/007* (2013.01); *F01M 5/002* (2013.01); *F01M 11/03* (2013.01); *F01P 7/14* (2013.01);
(Continued)

(58) Field of Classification Search
CPC .... G05D 23/02; G05D 23/022; G05D 23/025; G05D 23/1852; F01P 7/00; F01P 7/14;
(Continued)

(56) References Cited

U.S. PATENT DOCUMENTS

| | | | |
|---|---|---|---|
| 3,658,243 A | 4/1972 | Beatenbough et al. | |
| 3,734,405 A * | 5/1973 | Wagner | F01P 7/16 236/34.5 |

(Continued)

FOREIGN PATENT DOCUMENTS

| | | |
|---|---|---|
| CN | 101809522 A | 8/2010 |
| CN | 103696824 | 4/2014 |

(Continued)

OTHER PUBLICATIONS

Advantages of Die Casting—Premier Die Casting Company Nov. 2013.*

(Continued)

*Primary Examiner* — Len Tran
*Assistant Examiner* — Jenna M Hopkins
(74) *Attorney, Agent, or Firm* — Faegre Drinker Biddle & Reath LLP (57) ABSTRACT

A filter head of an engine includes a conduit extending along a longitudinal axis and a thermostat extending longitudinally within the conduit. The thermostat is movable between an open position and a closed position. The filter head also includes a sealing member positioned within the conduit downstream from the thermostat. The thermostat abuts the sealing member to inhibit flow through the conduit when in the open position and the thermostat is longitudinally spaced apart from the sealing member to permit axial flow of fluid through the conduit when in the closed position.

18 Claims, 7 Drawing Sheets

(51) Int. Cl.
*F28F 27/02* (2006.01)
*F01P 7/14* (2006.01)
*F01P 7/16* (2006.01)
*G05D 23/02* (2006.01)
*F28D 21/00* (2006.01)

(52) U.S. Cl.
CPC ................ *F01P 7/16* (2013.01); *F28F 27/02* (2013.01); *G05D 23/02* (2013.01); *F01P 2060/04* (2013.01); *F28D 2021/0089* (2013.01)

(58) Field of Classification Search
CPC .......... F01P 7/16; F01P 7/26; F01P 2007/146; F01M 5/007; F01M 5/002; F28F 27/02
USPC .............................................. 236/34.5, 99 K
See application file for complete search history.

(56) References Cited

U.S. PATENT DOCUMENTS

| | | | | |
|---|---|---|---|---|
| 4,027,643 A * | 6/1977 | Feenan | ................ | F01M 5/007 123/196 AB |
| 4,114,571 A * | 9/1978 | Ruf | ................ | F01M 1/08 123/196 AB |
| 4,190,198 A | 2/1980 | Casuga et al. | | |
| 4,270,562 A * | 6/1981 | Oberth | ................ | F01P 9/00 137/115.16 |
| 4,386,584 A * | 6/1983 | Calkins | ................ | G05D 23/022 123/41.08 |
| 4,423,751 A * | 1/1984 | Roettgen | ................ | B01D 35/143 137/557 |
| 4,426,965 A * | 1/1984 | Patel | ................ | F01M 5/002 123/196 AB |
| 4,580,719 A * | 4/1986 | Long, Jr. | ................ | G05D 23/1333 236/101 B |
| 4,653,688 A | 3/1987 | Grinsteiner | | |
| 4,666,081 A * | 5/1987 | Cook | ................ | F01P 7/167 236/34.5 |
| 4,748,941 A * | 6/1988 | Kashiwase | ................ | F01P 7/16 123/41.1 |
| 5,727,729 A | 3/1998 | Hutchins | | |
| 5,803,356 A * | 9/1998 | Babinger | ................ | F01P 11/16 137/219 |
| 5,904,844 A * | 5/1999 | Stone | ................ | B01D 27/06 210/232 |
| 6,000,421 A * | 12/1999 | Huemer | ................ | B60H 1/00485 123/41.1 |
| 6,029,686 A * | 2/2000 | Pirkle | ................ | F16K 31/002 137/315.25 |
| 6,244,516 B1 * | 6/2001 | Langervik | ................ | F01P 7/16 236/34.5 |
| 6,253,837 B1 * | 7/2001 | Seiler | ................ | F16H 57/0413 137/625.29 |
| 6,343,746 B2 * | 2/2002 | Chamot | ................ | F16K 31/04 236/34.5 |
| 6,742,716 B1 * | 6/2004 | Duprez | ................ | F01P 7/167 236/34.5 |
| 7,540,431 B2 * | 6/2009 | Kozdras | ................ | F28F 27/02 236/93 R |
| 7,748,442 B2 * | 7/2010 | Kalbacher | ................ | F01M 5/002 165/166 |
| 8,042,715 B2 * | 10/2011 | Charlier | ................ | B65D 47/243 137/79 |
| 8,220,720 B2 * | 7/2012 | Auweder | ................ | F01P 7/16 123/41.09 |
| 8,251,296 B2 * | 8/2012 | Mabboux | ................ | G05D 23/023 236/100 |
| 8,430,332 B2 * | 4/2013 | Bouloy | ................ | G05D 23/022 236/100 |
| 8,469,083 B2 * | 6/2013 | Jainek | ................ | F01M 5/002 165/280 |
| 8,550,371 B2 * | 10/2013 | Bouloy | ................ | F16K 31/002 236/100 |
| 8,720,408 B1 * | 5/2014 | Neal | ................ | F01M 5/002 123/196 AB |
| 8,991,719 B2 * | 3/2015 | Sheppard | ................ | F01M 5/007 165/103 |
| 9,360,262 B2 * | 6/2016 | Kim | ................ | F28F 27/02 |
| 9,939,077 B2 * | 4/2018 | Gao | ................ | F16K 31/002 |
| 9,945,623 B2 * | 4/2018 | Sheppard | ................ | F28F 27/00 |
| 9,951,663 B2 * | 4/2018 | Kim | ................ | F01M 5/007 |
| 2005/0039719 A1 * | 2/2005 | Moss | ................ | F01M 1/12 123/196 AB |
| 2005/0161519 A1 * | 7/2005 | Kalbacher | ................ | F01M 5/007 236/34.5 |
| 2005/0268866 A1 * | 12/2005 | Finkbeiner | ................ | F01P 7/16 123/41.1 |
| 2006/0016900 A1 * | 1/2006 | Brown | ................ | F01M 5/007 236/34.5 |
| 2006/0065229 A1 * | 3/2006 | Hoi | ................ | B63H 21/21 123/196 AB |
| 2006/0065230 A1 * | 3/2006 | Hoi | ................ | F01M 5/007 123/196 AB |
| 2007/0290056 A1 * | 12/2007 | Fishman | ................ | F01P 7/16 236/34.5 |
| 2008/0029246 A1 * | 2/2008 | Fratantonio | ......... | F16H 57/0412 165/103 |
| 2012/0312884 A1 | 12/2012 | Yajima | | |
| 2013/0319634 A1 * | 12/2013 | Sheppard | ................ | F28F 27/00 165/96 |
| 2013/0334328 A1 * | 12/2013 | Iwamuro | ................ | G05D 23/022 236/99 K |
| 2014/0317923 A1 * | 10/2014 | Neal | ................ | F01M 5/00 29/888.011 |
| 2015/0300218 A1 * | 10/2015 | Taguchi | ................ | F01M 1/08 123/196 CP |
| 2015/0330273 A1 * | 11/2015 | Chung | ................ | F01M 5/002 701/34.4 |
| 2016/0369670 A1 * | 12/2016 | Kim | ................ | F01M 5/007 |
| 2017/0051644 A1 * | 2/2017 | Lagerlof | ................ | F01M 5/005 |
| 2017/0254254 A1 * | 9/2017 | Posternak | ................ | F01P 7/16 |
| 2017/0342877 A1 * | 11/2017 | Harres | ................ | F01M 11/10 |

FOREIGN PATENT DOCUMENTS

| | | |
|---|---|---|
| CN | 203948145 U | 11/2014 |
| CN | 104564218 | 4/2015 |

OTHER PUBLICATIONS

Office Action issued by the State Intellectual Property Office (SIPO), dated Aug. 20, 2018, for Chinese Patent Application No. 201610656385.6; 8 pages.

English Translation of Office Action issued by the State Intellectual Property Office (SIPO), dated Aug. 20, 2018, for Chinese Patent Application No. 201610656385.6; 12 pages.

Examination report issued by the China National Intellectual Property Administration, dated Apr. 23, 2019, for Chinese Application No. 201610656385.6; 8 pages.

Examination report issued by the China National Intellectual Property Administration (translated to English language), dated Apr. 23, 2019, for Chinese Application No. 201610656385.6; 11 pages.

* cited by examiner

Fig. 7

COOLING ASSEMBLY FOR A FILTER HEAD OF AN ENGINE

CROSS-REFERENCE TO RELATED APPLICATIONS

The present application claims priority to U.S. Provisional Patent Application Ser. No. 62/209,579, filed Aug. 25, 2015, and entitled "COOLING ASSEMBLY FOR A FILTER HEAD OF AN ENGINE", the complete disclosure of which is expressly incorporated by reference herein.

TECHNICAL FIELD OF THE DISCLOSURE

The present disclosure relates to a cooling assembly within a filter head of an engine and, more particularly, to a sealing member of the cooling assembly which allows for axial flow of lubrication fluid through the cooling assembly.

BACKGROUND OF THE DISCLOSURE

Various types of engines may include filter heads for fluids that flow through the engine. For example, an engine may include an oil filter head which filters debris, particulate matter, and contaminants from engine oil and/or cooling oil. More particularly, before oil is pumped to various components of the engine to lubricate and/or cool the components during operation of the engine, the oil may pass through a filter in the filter head.

Engine oil is recirculated through portions of the engine during operation of the engine for constant lubrication and/or cooling of the components of the engine. However, as the temperature of the engine increases during operation of the engine, the temperature of the oil also may rise. Therefore, the filter head for the oil may include a cooling assembly to monitor and decrease the temperature of the oil before circulating the oil to the components of the engine.

However, as the oil flows through the cooling assembly in the filter head, a decrease or parasitic loss in the pressure of the oil flowing therethrough may occur due to restrictions in the oil flow path through the cooling assembly. As such, the engine may operate less efficiently due to the decreased pressure of the oil through a conduit of the cooling assembly. For example, the fuel economy of the engine may decrease and/or the engine may operate with less lubrication due to the decreased pressure of the flow of oil through the cooling assembly. Therefore, there is a need for a cooling assembly within a filter head which decreases any drop in the pressure of the oil flowing therethrough.

Additionally, the cooling assembly within the filter head may include a housing defining a flow path for the oil through the filter head. The housing may be formed through a conventional sand-casting process. However, sand-casting processes may introduce contaminants and/or particulate matter into the filter head due to the use of sand during casting. As such, additional processing steps may be needed to remove residual sand or particulates from the housing before assembly with the engine. Therefore, there is a need for a method of forming a cooling assembly for a filter head which decreases contamination and additional processing steps during formation.

SUMMARY OF THE DISCLOSURE

In one embodiment of the present disclosure, a filter head of an engine comprises a conduit extending along a longitudinal axis and a thermostat extending longitudinally within the conduit. The thermostat is movable between an open position and a closed position. The filter head also comprises a sealing member positioned within the conduit downstream from the thermostat. The thermostat abuts the sealing member to inhibit flow through the conduit when in the open position and the thermostat is longitudinally spaced apart from the sealing member to permit axial flow of fluid through the conduit when in the closed position.

In another embodiment of the present disclosure, a method of cooling fluid in a filter head of an engine comprises determining a temperature of fluid within the filter head with a thermostat and positioning a sealing member within the filter head and downstream of the thermostat. Additionally, the method comprises flowing the fluid axially through a housing of the thermostat and around an outer surface of the sealing member when the temperature of the fluid is below a predetermined temperature. The method also comprises moving the housing of the thermostat to a position abutting the sealing member when the temperature of the fluid is above a predetermined temperature and flowing the fluid through a cooling conduit when the housing of the thermostat moves to the position abutting the sealing member.

In a further embodiment of the present disclosure, a method of forming a filter head of an engine comprises providing a die-casting mold, providing a metallic material within the die-casting mold, and cooling the metallic material within the die-casting mold.

Advantages and features of the embodiments of this disclosure will become more apparent from the following detailed description of exemplary embodiments when viewed in conjunction with the accompanying drawings.

DETAILED DESCRIPTION OF THE DRAWINGS

Figure 1:
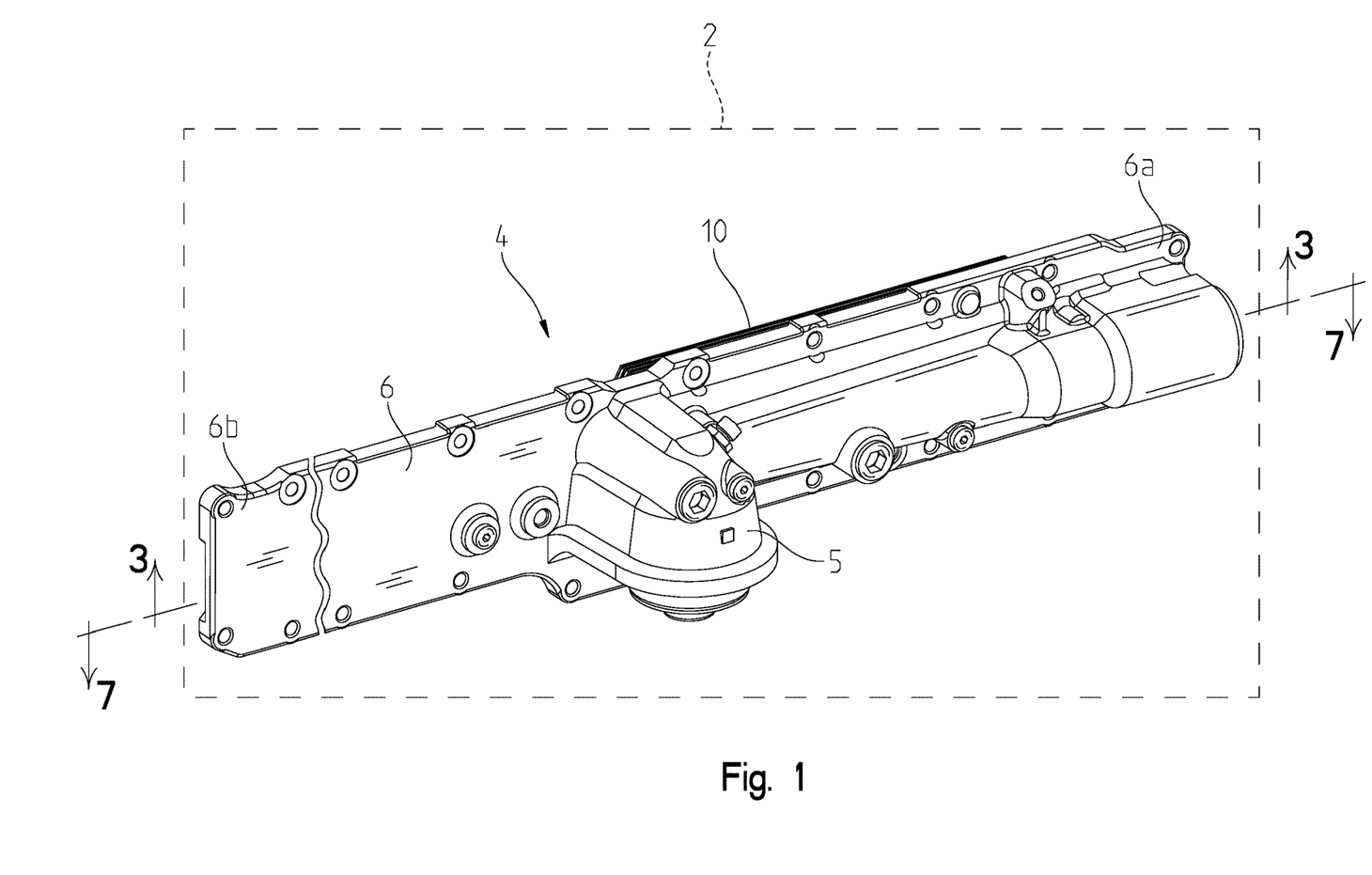
FIG. 1 is a perspective view of a cooling assembly for a filter head of an engine of the present disclosure.
Figure 2:
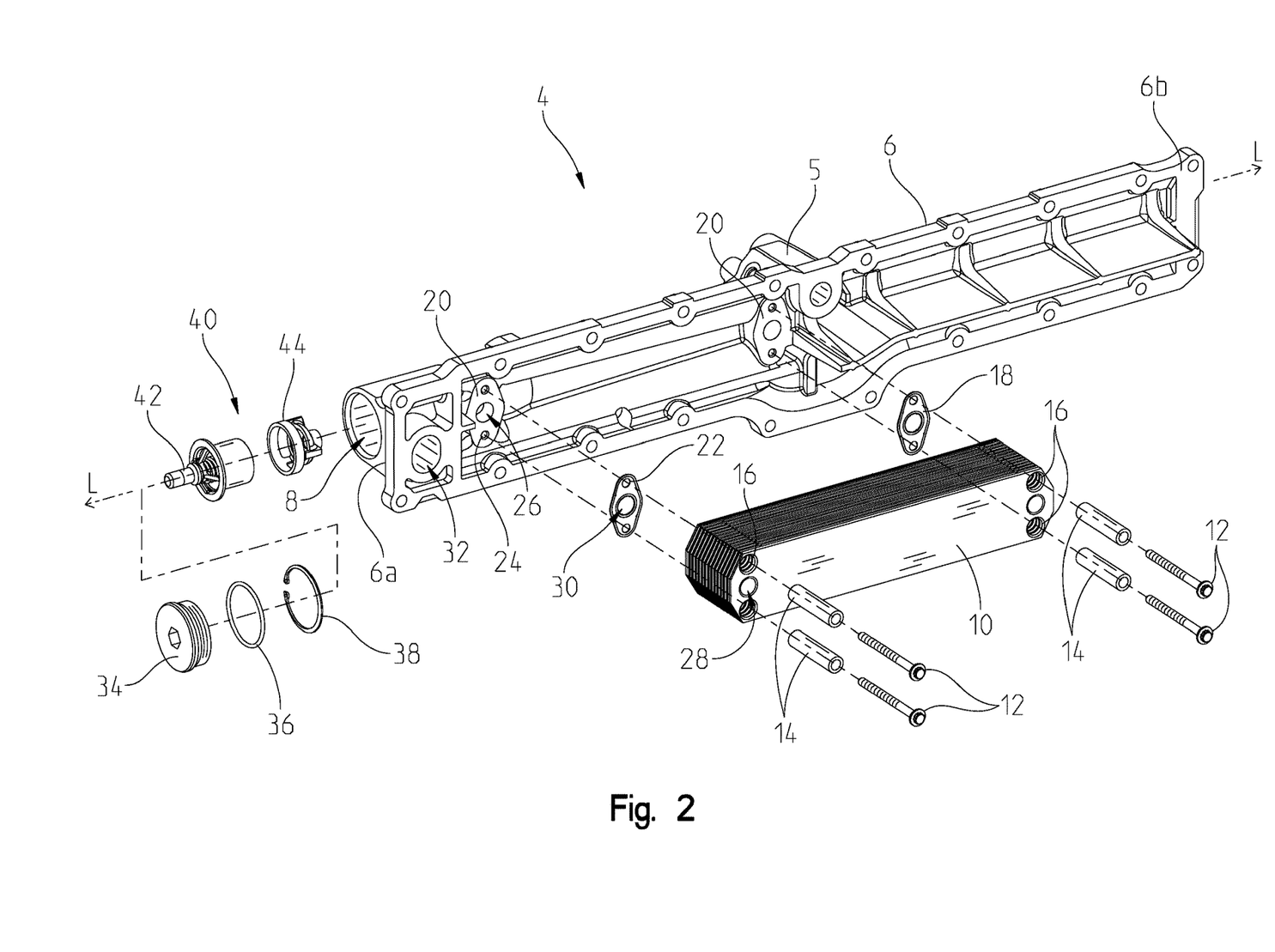
FIG. 2 is an exploded view of the cooling assembly of FIG. 1.
Figure 3:
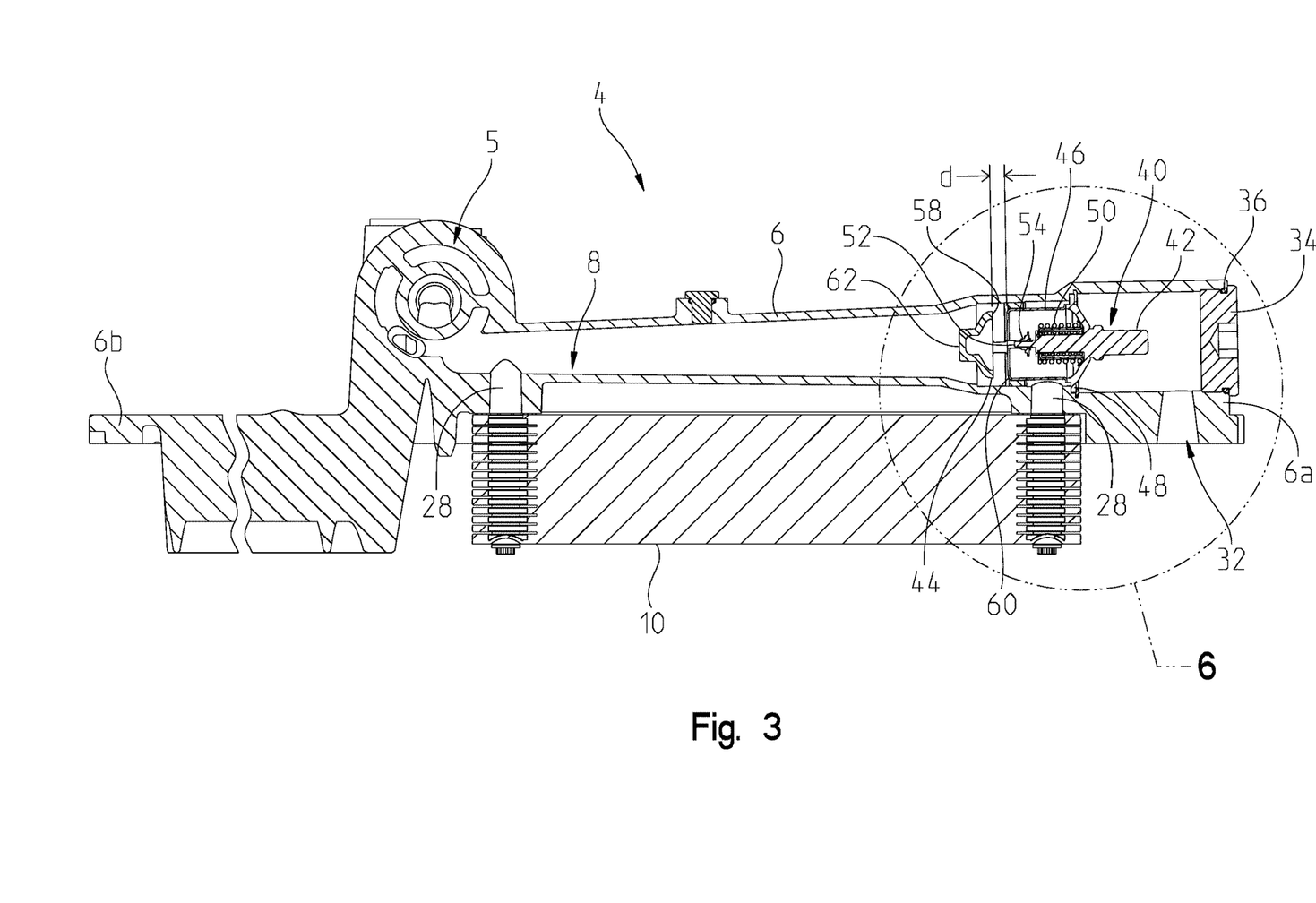
FIG. 3 is a cross-sectional view of the cooling assembly of FIG. 1, taken along line 3-3 of FIG. 1.

Referring to FIGS. 1-3, a filter head 2 of an engine (not shown) includes a cooling assembly 4 and a filter assembly 5. The engine may be any type of engine configured for a vehicle or configured to be supported on an engine pad supported on the ground. The engine also is configured to receive any type of fuel, such as diesel fuel, gasoline, natural gas, or any other type of fuel.

Filter head 2 is configured to filter contaminants and/or particulate matter from lubrication fluid for the engine. More particularly, during operation of the engine, various components of the engine are lubricated with lubrication fluids (e.g., oil), however, if the lubrication fluid includes debris or contaminants, these contaminants may damage the components of the engine as one component moves relative to another component. Therefore, filter assembly 5 of filter head 2 filters contaminants, debris, and/or particulate matter from the lubrication fluid prior to the lubrication fluid flowing towards the components of the engine. Illustratively, filter assembly 5 is coupled to or integrally formed with cooling assembly 4.

As the engine operates, the temperature of the engine increases and the temperature of the lubrication fluid flowing to various components of the engine also increases. Therefore, as the lubrication fluid flows through filter head 2, the lubrication fluid may be cooled by cooling assembly 4. As shown in FIGS. 1-3, cooling assembly 4 includes a housing 6 extending along a longitudinal axis L between a first end 6a and a second end 6b (FIG. 2). In one embodiment, housing 6 is formed through a die-casting process, rather than a sand-casting process, which reduces the amount of contaminants (e.g., sand) which may be introduced into housing 6. More particularly, housing 6 may be formed by heating a metallic material (e.g., aluminum, steel, etc.) and pouring or otherwise positioning the heated material within a die-casting mold formed in the desired shape of housing 6. The metallic material is then cooled in the die-casting mold to maintain the shape of the mold. Once cooled, the metallic material is released from the mold in the general shape of housing 6 and further processing steps, if needed, may be performed. By forming housing 6 through die-casting, no sand is used during the formation thereof and, therefore, additional processing steps to remove residual sand from housing 6 after formation are not needed, which reduces the likelihood that contaminants are present in housing 6. Additionally, the die-casting process for forming housing 6 decreases the machining or other processing steps needed to smooth rough surfaces of housing 6 because die-casting results in smoother surfaces of housing 6. By decreasing the number of processing steps needed to form housing 6, the cost of making housing 6 may be reduced and there is a reduced likelihood of introducing contaminants or particulate matter into the engine.

As shown in FIGS. 2 and 3, housing 6 includes an internal conduit 8 which is fluidly coupled to a cooler 10. Cooler 10 is coupled to housing 6 with fasteners 12 which are received through bushings 14 to maintain a bolted joint clamp load through thermal cycle events of the engine. Bushings 14 and fasteners 12 extend through openings 16 of cooler 10 and fasteners 12 extend through apertures 22 of a gasket 18 to couple with a mounting body 20 of housing 6. In particular, gasket 18 is positioned intermediate cooler 10 and mounting body 20 and fasteners 12 extend through apertures 22 and into apertures 24 of mounting body 20 to threadedly or otherwise couple cooler 10 to housing 6.

Referring to FIG. 2, mounting bodies 20 each include a port 26 which is fluidly coupled with conduit 8 and cooler 10. More particularly, ports 26 are aligned with an opening 30 of gasket 18 and channels 28 of cooler 10. As such, the lubrication fluid within cooling assembly 4 may flow through conduit 8 and into and out of cooler 10 through ports 26 to decrease the temperature of the lubrication fluid, as disclosed further herein.

Referring still to FIG. 2, the lubrication fluid may flow into cooling assembly 4 through an inlet 32 adjacent first end 6a of housing 6. Because first end 6a of housing 6 is sealed with a plug 34, the lubrication fluid is directed through conduit 8 after entering housing 6 through inlet 32. As shown in FIG. 2, plug 34 is sealed against first end 6a with a sealing member 36 (e.g., an o-ring) and retained therein through a threaded connection.

Referring to FIGS. 3-7, cooling assembly 4 also includes a temperature assembly 40 positioned within a portion of conduit 8 and supported by housing 6. Illustrative temperature assembly 40 includes a temperature sensor 42 (e.g., a thermostat or thermistor) and a sealing member 44 which is retained within housing 6 by a retaining member 38 (e.g., a spring) (FIG. 2). Temperature sensor 42 is positioned within a housing 46 of temperature assembly 40. Housing 46 may be comprised of a metallic material (e.g., steel). A flange 48 abuts a radial surface 64 of conduit 8 and abuts a proximate end of housing 46 to retain temperature sensor 42 therein. A spring 50 is positioned around a portion of temperature sensor 42 for movement of housing 46 within conduit 8 between an open position and a closed position, as disclosed further herein.

The distal end of temperature sensor 42 includes a protrusion 52 which is received within a nose member 54 of housing 46. Nose member 54 is positioned radially within housing 46 and is supported within housing 46 by arms 56 of housing 46. Nose member 54 is longitudinally spaced apart from sealing member 44 of temperature assembly 40. Sealing member 44 may be comprised of a metallic material (e.g., aluminum) and has a generally circular shape which is complementary to the shape of housing 46. As disclosed further herein, a sealing surface 58 of sealing member 44 is configured to abut and contact a sealing surface 60 of housing 46, as shown in FIG. 7, to affect the flow of the lubrication fluid through cooling assembly 4. However, when temperature assembly 40 is in the closed position shown in FIGS. 3 and 6, sealing surface 58 may be spaced apart from sealing surface 60 by a distance d (FIG. 3) of less than 0.5 inches. In one embodiment, distance d is approximately 0.3-0.4 inches and may be 0.37 inches.

Figure 4:
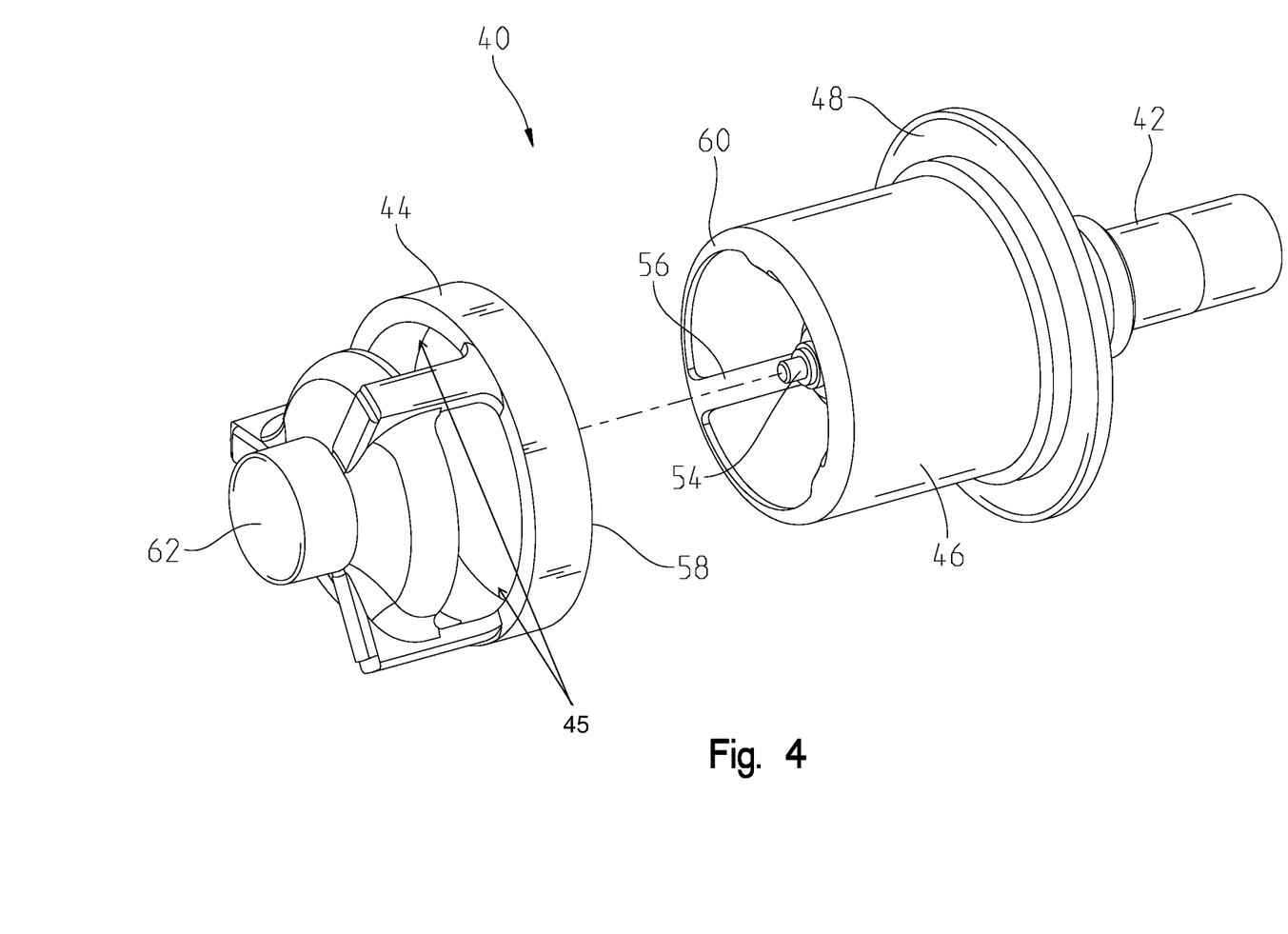
FIG. 4 is a first exploded view of a temperature assembly positioned within a portion of the cooling assembly of FIG. 1.
Figure 5:
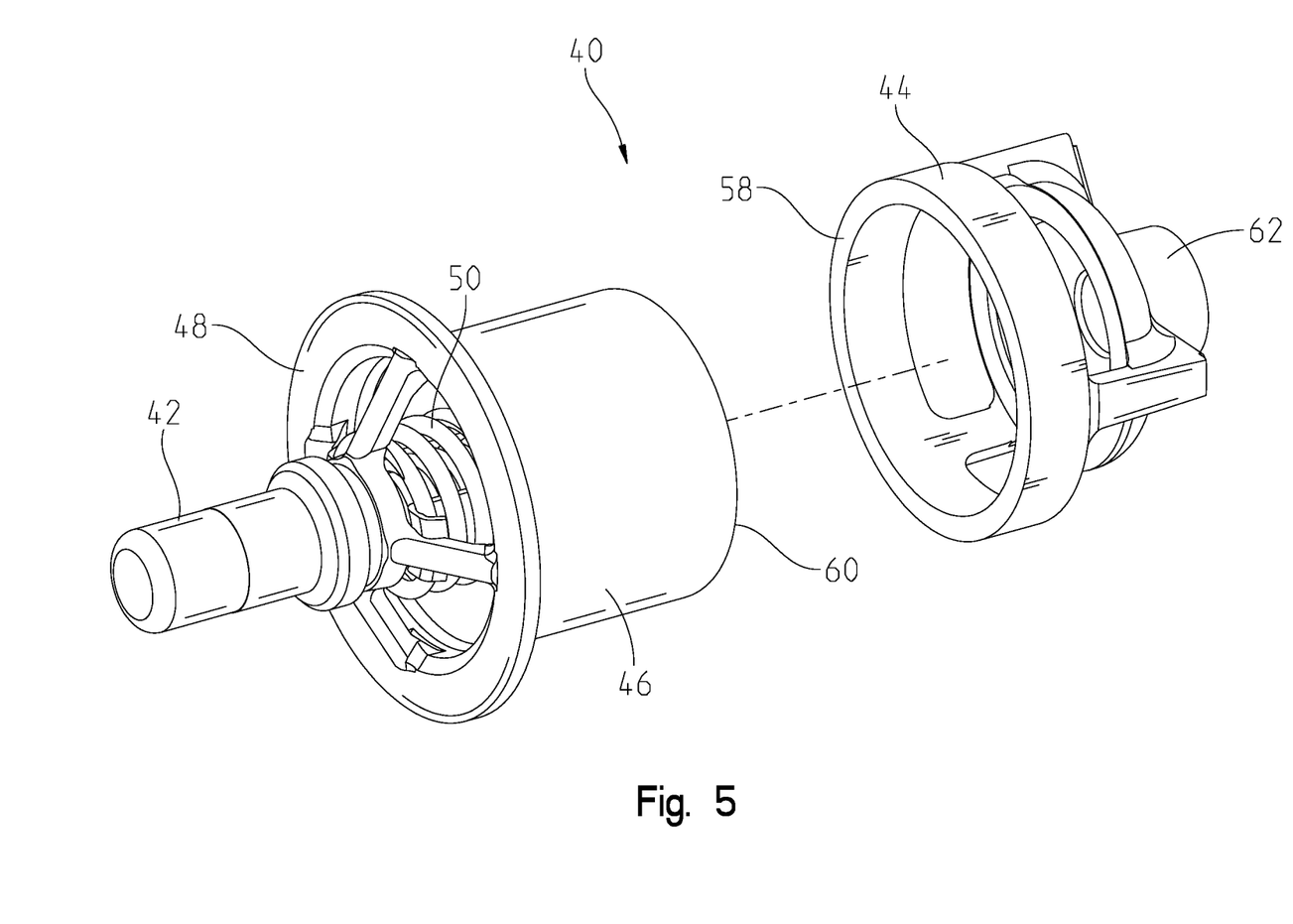
FIG. 5 is a second exploded view of the temperature assembly of FIG. 4.

As shown in FIGS. 3-7, sealing member 44 has a tapered configuration, with sealing surface 58 defining the largest radial surface of sealing member 44 and a distal end 62 defining the smallest radial surface of sealing member 44. In one embodiment, the outer diameter of sealing surface 58 is radially spaced apart from radial surface 64 of conduit 8 by a distance D of less than 0.5 inches (FIG. 7). In one embodiment, distance D is approximately 0.2-0.3 inches and, more particularly, approximately 0.21 inches. Sealing member 44 may be supported within conduit 8 by a support (not shown) of housing 6. In one embodiment, the support may be machined into housing 6 and configured to be press fit with sealing member 44 to maintain the position of sealing member 44 within conduit 8. Illustratively, sealing member 44 includes at least one aperture 45, as shown in FIG. 4.

Figure 6:
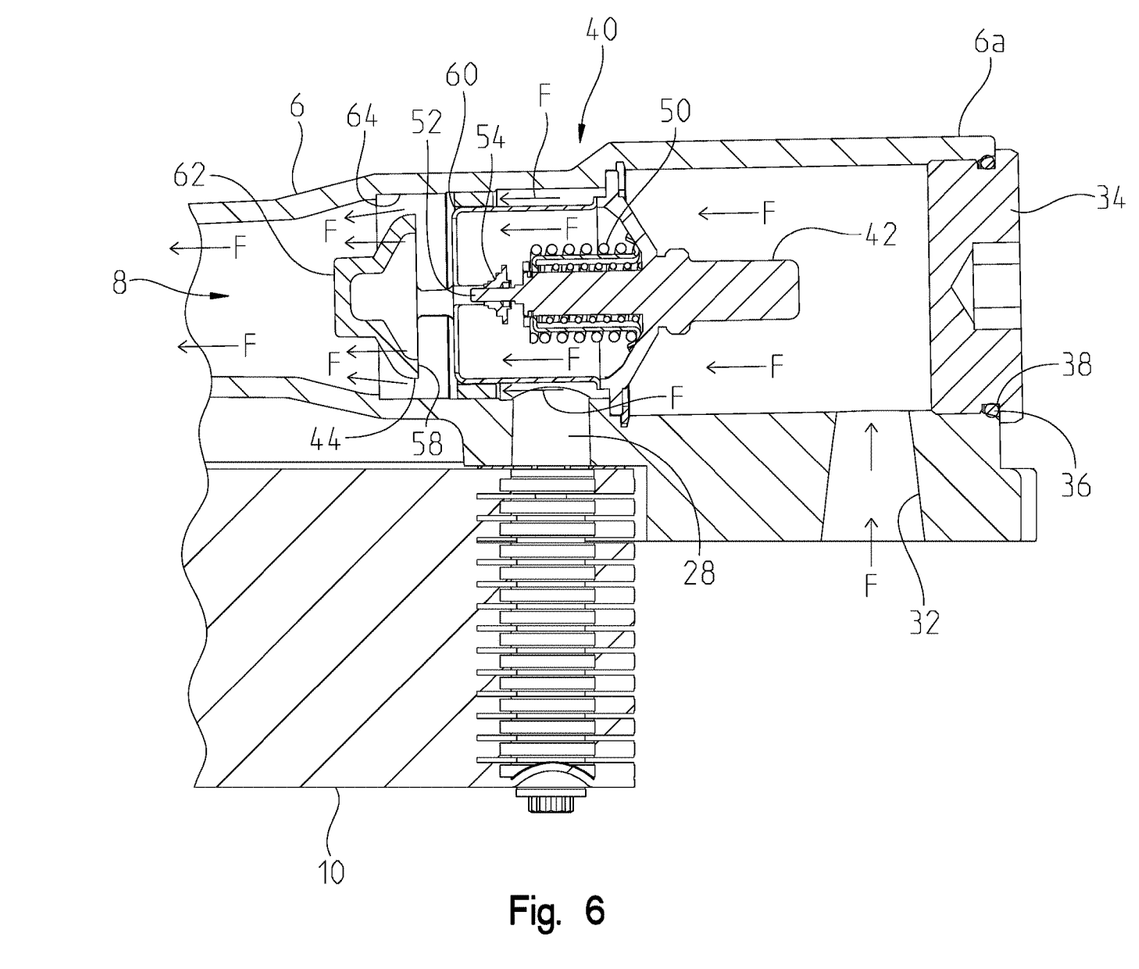
FIG. 6 is a detailed view of a portion of the cooling assembly of FIG. 3.
Figure 7:
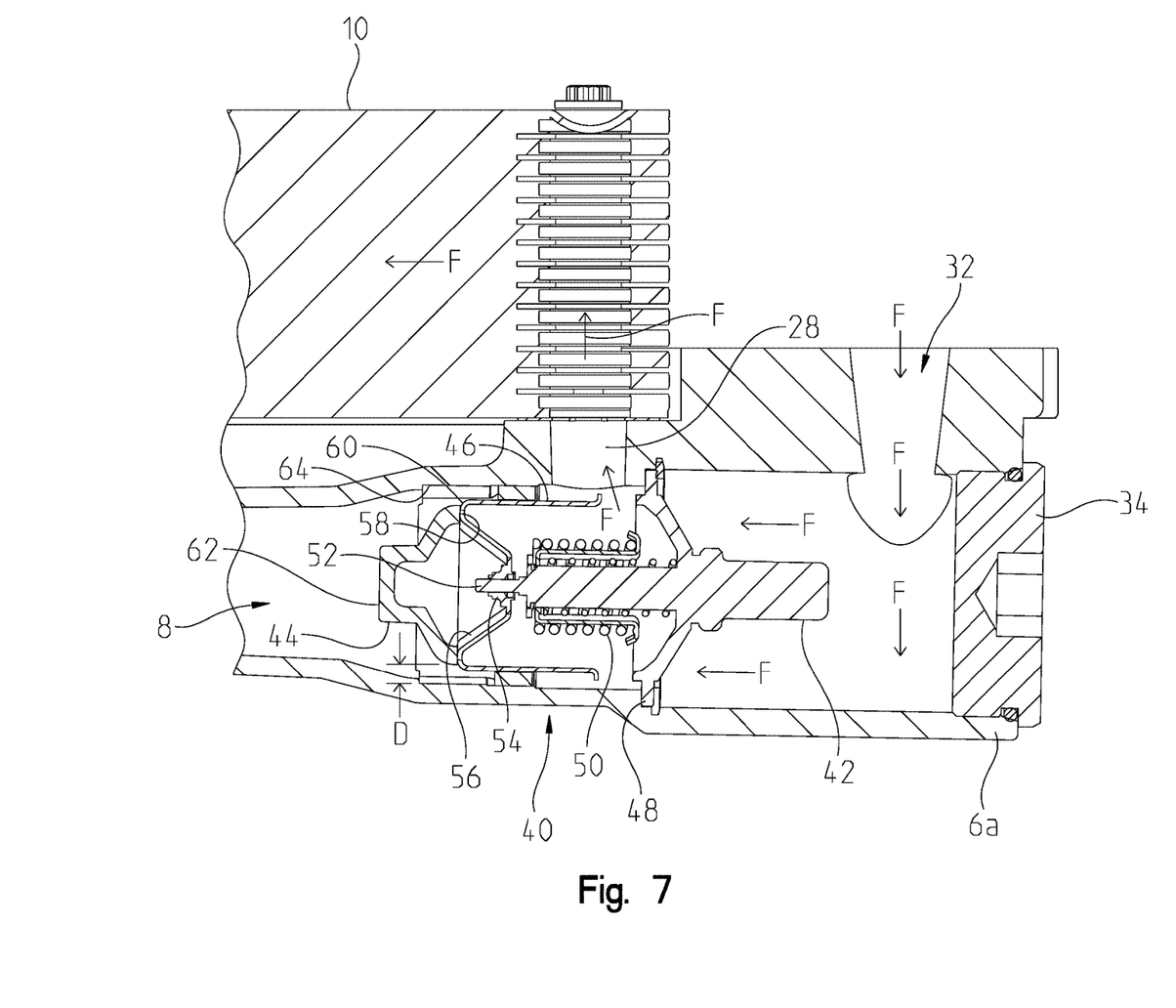
FIG. 7 is a cross-sectional view of the cooling assembly of FIG. 1, taken along line 7-7 of FIG. 1.

Referring to FIGS. 6 and 7, during operation of the engine, lubrication fluid (e.g., lubrication oil) is pumped into filter head 2 with a pump (not shown) before flowing to various components of the engine. Filter assembly 5 of filter head 2 is configured to allow installation of a filter to remove particulate matter, contaminants, and/or debris from the lubrication fluid prior to the lubrication fluid flowing to the moving components of the engine to decrease the likelihood of contaminants in the lubrication fluid damaging these components of the engine.

However, as the engine operates, the temperature of the engine increases and, therefore, the temperature of the lubrication fluid flowing therethrough also may increase. Temperature assembly 40 is configured to determine the temperature of the lubrication fluid flowing through conduit 8 of cooling assembly 4 to determine if the lubrication fluid should be cooled by cooler 10. More particularly, and as shown in FIGS. 6 and 7, during operation of the engine, the flow of the lubrication fluid, denoted by arrows F, passes into filter head 2 through inlet 32 and is directed into conduit 8. As the lubrication fluid flows past temperature assembly 40, temperature sensor 42 senses or otherwise determines the temperature of the lubrication fluid. Alternatively, cooling assembly 4 may include a viscosity sensor (not shown) for determining the viscosity, rather than the temperature, of the lubrication fluid.

As shown in FIG. 6, if the temperature of the lubrication fluid is below a predetermined temperature (e.g., at the start of operation of the engine when the temperature of the lubrication is decreased and/or the viscosity of the lubrication fluid is elevated), cooling assembly 4 is in a bypass mode such that the lubrication fluid enters filter head 2 through inlet 32, flows into conduit 8 and past temperature assembly 40, and then flows into filter assembly 5 before flowing into the engine. More particularly, when in the bypass mode of FIG. 6, sealing surface 60 of housing 46 is spaced apart from sealing surface 58 of sealing member 44 such that temperature assembly 40 is in a closed position and housing 46 inhibits flow into channels 28 of cooler 10, thereby inhibiting or preventing the lubrication fluid from entering cooler 10. In this way, the lubrication fluid bypasses cooler 10 and flows directly through conduit 8 and into filter assembly 5 because the temperature of the lubrication fluid is less than a predetermined temperature.

When the lubrication fluid is below a predetermine temperature and cooling assembly 4 is in the bypass mode, distance D between radial surface 64 of conduit 8 and sealing surface 58 of sealing member 44 may restrict the flow F of the lubrication fluid which may lead to a parasitic loss or drop in the pressure of the lubrication fluid across distance D. However, to reduce the parasitic loss in the pressure of the lubrication fluid across distance D, the lubrication fluid has an axial flow through conduit 8 due to aperture 45 and the shape and orientation of sealing member 44. More particularly, the tapered configuration of sealing member 44 allows the lubrication fluid to flow axially around the outer surface of and/or through sealing member 44 to maintain a consistent and continuous axial flow through conduit 8. As shown in FIG. 6, the flow F of the lubrication fluid is parallel to longitudinal axis (FIG. 2) such that the flow F of the lubrication fluid does not bend around any particular component of cooling assembly 4 because a change in the direction of the flow F leads to an increased loss of pressure of the flow F of the lubrication fluid through conduit 8. Because the flow F of the lubrication fluid maintains an axial flow through conduit 8, any parasitic loss or drop in pressure of the flow F of the lubrication fluid is reduced, even as the lubrication fluid flows across distance D between radial surface 64 of conduit 8 and sealing surface 58 of sealing member 44. More particularly, a decrease in the pressure of the flow F across distance D may be less than 3 psi and, in one embodiment, may be less than 2.4 psi. Additionally, the decrease in pressure of the flow F across distance D may be less than 17 kPa and, in one embodiment, may be less than 16.5 kPa. By decreasing the parasitic loss of the pressure of the lubrication fluid through conduit 8, the engine may operate more efficiently and fuel economy may be improved because the lubrication fluid continuously flows through the engine with minimal pressure loss.

However, as operation of the engine continues, the temperature of the lubrication fluid increases with the temperature of the engine. When the temperature of the lubrication fluid is above a predetermined temperature, cooling assembly 4 moves to a cooling mode, as shown in FIG. 7. More particularly, and as shown in FIG. 7, when the lubrication fluid flows into filter head 2 through inlet 32, the lubrication fluid flows past temperature assembly 40. When temperature sensor 42 senses or otherwise determines that the temperature of the lubrication fluid is above a predetermined temperature, cooling assembly 4 moves to the cooling mode by moving housing 46 away from flange 48 and toward sealing member 44. In particular, temperature assembly 40 moves to an open position in which housing 46 moves toward sealing member 44 until sealing surfaces 58, 60 abut which forms a seal between housing 46 and sealing member 44. As such, a passageway between the proximate end of housing 46 and flange 48 opens to allow or permit the lubrication fluid to flow into cooler 10 through ports 26 and channels 28. In this way, the lubrication fluid bypasses sealing member 44 and, instead, flows through cooler 10 to decrease the temperature of the lubrication fluid before flowing through filter assembly 5 and into the engine.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. A filter head of an engine, comprising:
   a conduit extending along a longitudinal axis;
   a thermostat assembly extending longitudinally within the conduit, the thermostat assembly including a housing and temperature sensor supported by the housing, and the housing of the thermostat assembly being movable between a first position and a second position; and
   a seal positioned within the conduit downstream from the housing and the temperature sensor relative to a direction of flow within the conduit, and the seal having a length defined between a maximum outer diameter portion and a minimum outer diameter portion, the seal having a tapered configuration extending along the length of the seal, and the seal further having a plurality of apertures along at least a portion of the length of the seal, the housing abutting the seal to inhibit flow through the conduit when in the first position and the housing being longitudinally spaced apart from the seal to permit axial flow of fluid through the conduit when in the second position, and a maximum outer diameter of the seal is radially spaced apart from an inner radial surface of the conduit in a direction perpendicular to the direction of flow within the conduit to define a gap, and the gap is configured to receive the fluid when the housing is in the second position.

2. The filter head of claim 1, further comprising a cooler fluidly coupled to the conduit, and the fluid is permitted to flow into the cooler when the housing is in the first position.

3. The filter head of claim 2, wherein the cooler includes a flow channel which is angled relative to the conduit.

4. The filter head of claim 1, wherein the conduit defines an axial flow path between the housing and the temperature sensor when the housing is in the second position.

5. The filter head of claim 4, an outer surface of the seal defines a contact surface for the fluid when the housing is in the second position.

6. The filter head of claim 4, wherein the seal includes a sealing surface and the housing contacts the sealing surface of the seal when the housing is in the first position.

7. The filter head of claim 1, wherein the seal includes a sealing surface and a distance between an outer diameter of the sealing surface and the inner radial surface of the conduit is less than 0.5 inches, the distance extending in a direction perpendicular to the longitudinal axis.

8. A method of cooling fluid in a filter head of an engine, comprising:
   determining a temperature of fluid within a conduit of the filter head with a thermostat assembly defined by a housing and a temperature sensor supported by the housing;
   positioning a seal within the filter head and downstream of the housing relative to a direction of flow of the fluid, the seal including an outer surface defining a maximum outer diameter thereof and a minimum outer diameter thereof, the seal having a length extending between the maximum outer diameter and the minimum outer diameter, and the seal having a tapered configuration extending along the length and a plurality of apertures positioned along at least a portion of the length;
   flowing the fluid axially through the housing of the thermostat when the temperature of the fluid is below a predetermined temperature;
   flowing the fluid from the housing through a gap defined between the maximum outer diameter of the outer surface of the seal and a radially inner surface of the conduit;
   moving the housing of the thermostat to a position abutting the seal when the temperature of the fluid is above a predetermined temperature; and
   flowing the fluid through a cooling conduit when the housing of the thermostat assembly moves to the position abutting the seal.

9. The method of claim 8, wherein positioning the seal includes spacing the maximum outer diameter of the seal apart from an inner diameter of a conduit of the filter head.

10. The method of claim 9, wherein spacing the maximum outer diameter of the seal includes spacing the outer diameter of the seal apart from the inner diameter of the conduit by less than 0.5 inches.

11. The method of claim 9, wherein positioning the seal includes longitudinally spacing the seal apart from the housing of the thermostat.

12. The method of claim 11, wherein positioning the seal includes spacing the seal apart from the housing of the thermostat by a distance of 0.3-0.4 inches.

13. The method of claim 8, further comprising forming the filter head through a die-casting process.

14. The filter head of claim 1, wherein the seal has a sealing surface defining the largest radial surface thereof and a distal end defining the smallest radial surface thereof.

15. The filter head of claim 1, wherein the housing defines an opening configured to allow fluid to flow into the cooler when the thermostat is in the first position.

16. The filter head of claim 1, wherein the maximum outer diameter of the seal is less than a maximum outer diameter of the housing.

17. The filter head of claim 1, wherein the fluid is configured to flow around an outer surface of the seal.

18. The filter head of claim 1, wherein the fluid flows through an entirety of the gap.

* * * * *